United States Patent
Wong et al.

(10) Patent No.: US 6,226,659 B1
(45) Date of Patent: *May 1, 2001

(54) METHOD AND APPARATUS FOR PROCESSING REPORTS

(75) Inventors: Simon Wong, Redwood Shores; Stewart Wilson, Alameda; Marco Tilli, Hayward, all of CA (US)

(73) Assignee: Oracle Corporation, Redwood Shores, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/710,440

(22) Filed: Sep. 17, 1996

(51) Int. Cl.[7] .................................... G06F 17/30
(52) U.S. Cl. .............................. 707/526; 707/1
(58) Field of Search ................. 710/30, 203, 100; 707/104, 526, 1; 709/107

(56) References Cited

U.S. PATENT DOCUMENTS

| | | | |
|---|---|---|---|
| 5,379,427 | * 1/1995 | Hiroshima | 709/107 |
| 5,504,897 | 4/1996 | Gans et al. . | |
| 5,644,786 | * 7/1997 | Gallagher et al. | 710/30 |
| 5,671,365 | * 9/1997 | Binford et al. | 710/100 |
| 5,832,504 | * 11/1998 | Tripathi et al. | 707/104 |
| 5,835,762 | 11/1998 | Gans et al. . | |
| 5,875,343 | * 2/1999 | Binford et al. | 710/203 |

* cited by examiner

*Primary Examiner*—Wayne Amsbury
(74) *Attorney, Agent, or Firm*—Hickman Palermo Truong and Becker LLP; Edward A. Becker (57) ABSTRACT

A method and apparatus are provided for processing reports. Upon system startup, a report server automatically starts one or more report processes. As client report commands are received from one or more client applications, the client report commands are assigned to one or more of the executing report processes. After a report is completed, the report process is automatically reinitialized and kept active to process another report. The report server automatically adjusts the number of active report processes based on the current report processing load requirements. According to another aspect of the present invention, a report queue is provided to store client report commands as they are received from the client applications. A report queue manager is also provided for externally managing the report queue.

56 Claims, 4 Drawing Sheets

METHOD AND APPARATUS FOR PROCESSING REPORTS

FIELD OF THE INVENTION

The present invention relates to data processing, and more specifically, to a method and apparatus for processing reports.

BACKGROUND OF THE INVENTION

Data processing is one of the most important functions of a computing system. The results of data processing are often arranged in a report, which may be printed or simply reside in a data file or report file. Due to the proliferation of information systems, the variety and complexity of reports is almost unlimited. This is particularly true in distributed computing environments where data is often retrieved from separate databases in remote locations to process a report. However, as the size and sophistication of reports increase, ever increasing demands are placed on available processing resources, particularly when multiple reports are processed on the same machine that is executing the application software.

Figure 1A:
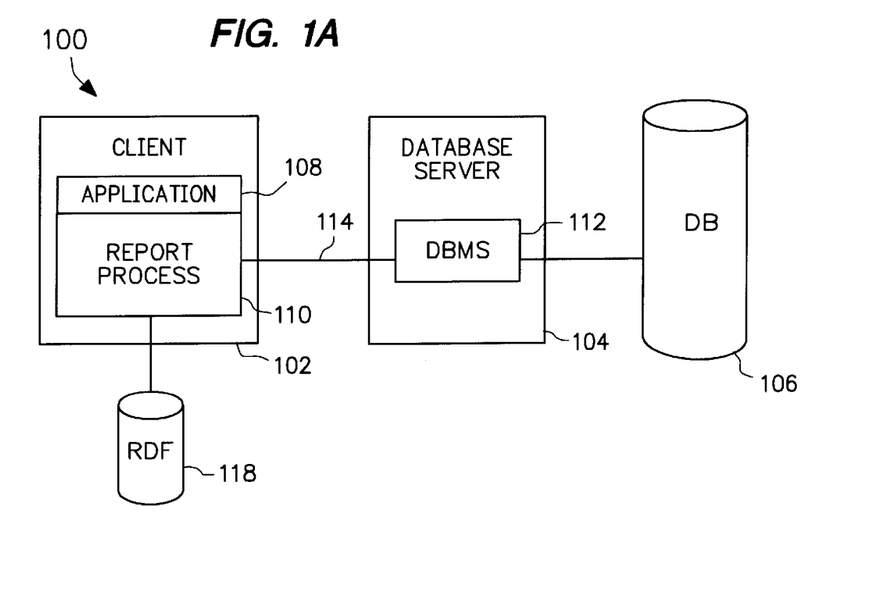
FIG. 1A illustrates a conventional report processing system.

Consider the conventional report processing arrangement 100 illustrated in FIG. 1A which includes a client 102, a database server 104 and a database (DB) 106. When a report is to be prepared, a client application 108, executing on the client 102, starts a report process 110, which also executes on the client 102. The report process 110 then requests report data from a database management system (DBMS) 112, which in turn retrieves data from the DB 106. The report process 110 automatically terminates upon completion of the report. Each time a report is to be generated, the client application 108 initiates a new report process 110. If several reports are to be generated simultaneously, the client application 108 starts a new report process 110 for each report, which all execute simultaneously on the client 102.

There are several disadvantages with this arrangement 100. First, starting a new report process 110 for each report increases the report processing time because of the time required to start a new report process 110. Moreover, executing report processes 110 on the client 102 can strain the processing resources of the client 102, particularly when several report processes 110 are executed simultaneously.

To reduce the processing burden placed on the client 102, some report processing systems have transferred the report processing from the client 102 processor to a different processor. For example, in the report processing arrangement illustrated in FIG. 1B, the report process 110 has been transferred from the client 102 to the database server 104. When a report is to be processed, the client application 108 issues a report command to the DBMS 112 through a database pipe or other similar communications mechanism 114. A report handler 116 periodically polls the DBMS 112 to determine whether a report needs to be generated. When a report needs to be generated, the report handler 116 reads the report command from the DBMS 112 and then starts a report process 110 to process the report. A report definition file (RDF) 118 is opened for each report process 110.

Figure 1B:
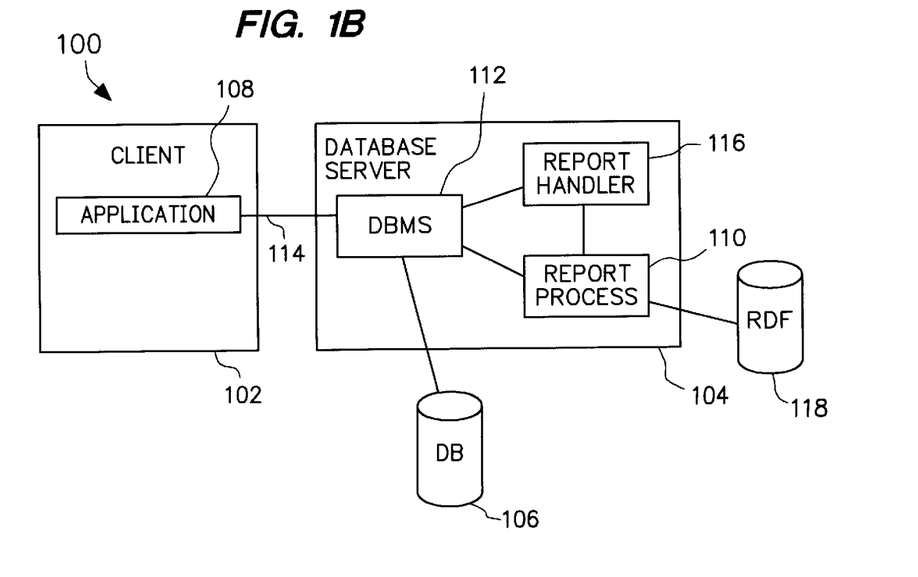
FIG. 1B illustrates another conventional report processing system.

This arrangement 100 minimizes the processing burden on the client 102 attributable to report processing, but the time required to process a report is still adversely affected by the overhead associated with starting a report process 110 each time a report is to be generated. In addition, the client application 108 does not have direct access to report status. The client application 108 is limited to issuing database commands to the DBMS 112 to determine report process 110 status. However, the DBMS 112 is not designed to be used as a status/message center to provide report status to the client application 108. Some DBMSs 112 do not provide any report status to a client application 108 after a report command has been sent to the DBMS 112.

In view of the difficulties associated with processing reports, and the limitations in the solution described above, a more effective method and apparatus for processing reports is highly desirable.

SUMMARY OF THE INVENTION

A method and apparatus are provided for processing reports. According to one embodiment of the present invention, a method for processing reports includes the steps of starting and initializing a report process, processing a report in response to a report command and reinitializing the report process after the report has been processed without stopping the report process.

According to another aspect of the present invention, a report server is provided which, upon startup, automatically starts a report process. When the report server receives a report command from a client application, the report server commands the report process to process the required report. After the report is completed, the report process is automatically reinitialized and kept active to process the next report.

According to yet another aspect of the present invention, a report queue is provided to store report commands received by the report server from one or more client applications. A report queue manager is also provided to externally manage the report queue.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for processing reports is described. In the following description, for the purposes of explanation, numerous specific details are set forth in order to provide a thorough understanding of the present invention. It will be apparent, however, to a person of ordinary skill in the art that the present invention may be practiced without these specific details. In other instances, well-known structures and devices are shown in block diagram form in order to avoid unnecessarily obscuring the present invention.

Hardware Overview

Figure 2:
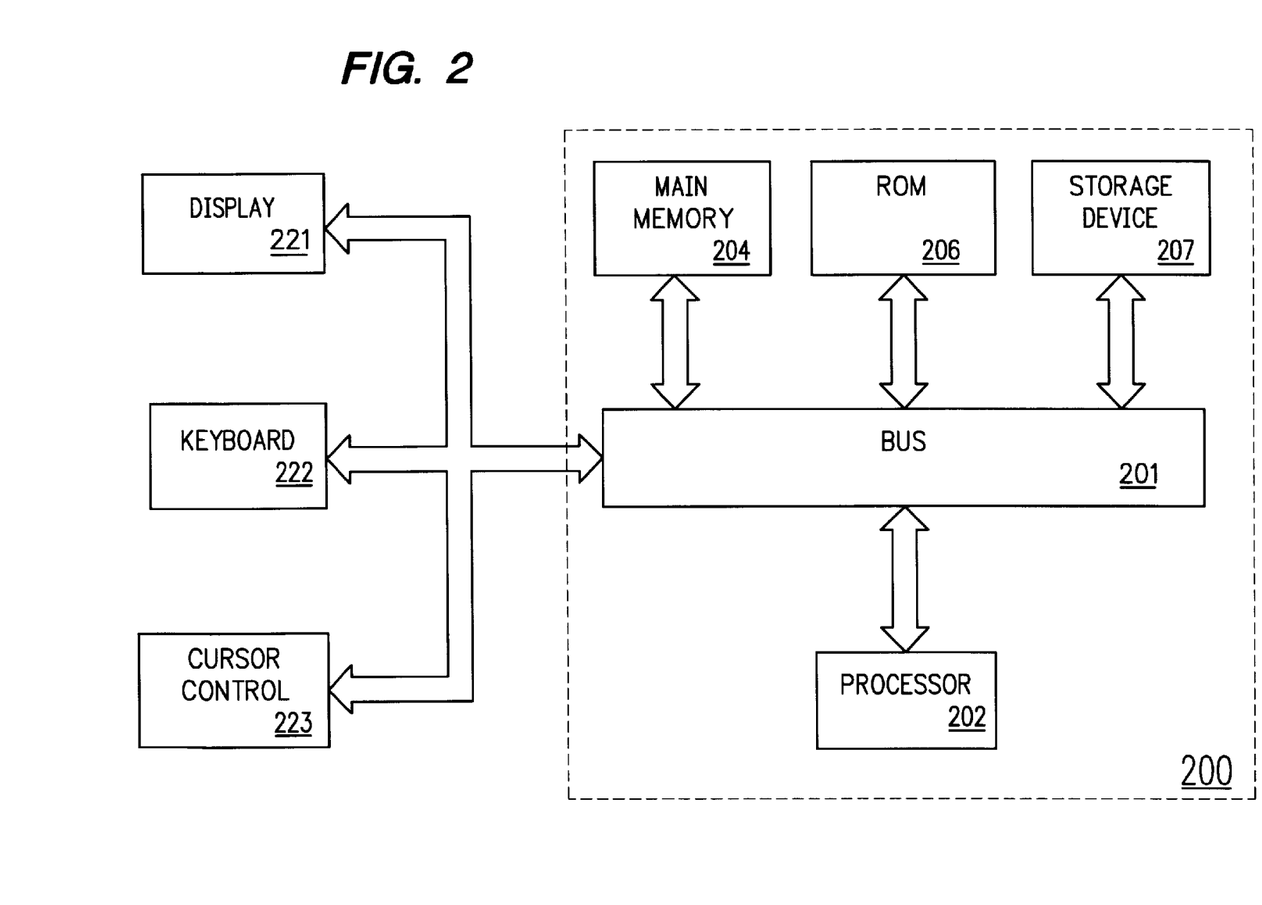
FIG. 2 is a block diagram of a computer system on which the present invention may be implemented.

FIG. 2 illustrates a block diagram of a computer system 200 upon which an embodiment of the present invention may be implemented. Computer system 200 includes a bus 201 or other communication mechanism for communicating information, and a processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also includes a read only memory (ROM) and/or other static storage device 206 coupled to bus 201 for storing static information and instructions for processor 202. A data storage device 207, such as a magnetic disk or optical disk, is coupled to bus 201 for storing information and instructions.

Computer system 200 may also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display 221. This input device typically has two degrees of freedom in two axes, a first axis (e.g., x) and a second axis (e.g., y), which allows the device to specify positions in a plane.

Alternatively, other input devices such as a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 222 wherein all interface is provided via the stylus as a writing instrument (like a pen) and the written text is interpreted using optical character recognition (OCR) techniques.

The present invention is related to the use of computer system 200 to facilitate the processing of reports. According to one embodiment, the processing of reports is performed by computer system 200 in response to processor 202 executing sequences of instructions contained in memory 204. Such instructions may be read into memory 204 from another computer-readable medium, such as data storage device. Execution of the sequences of instructions contained in memory 204 causes processor 202 to perform the process steps that will be described hereafter. In alternative embodiments, hard-wired circuitry may be used in place of or in combination with software instructions to implement the present invention. Thus, the present invention is not limited to any specific combination of hardware circuitry and software.

Functional Overview

Figure 3A:
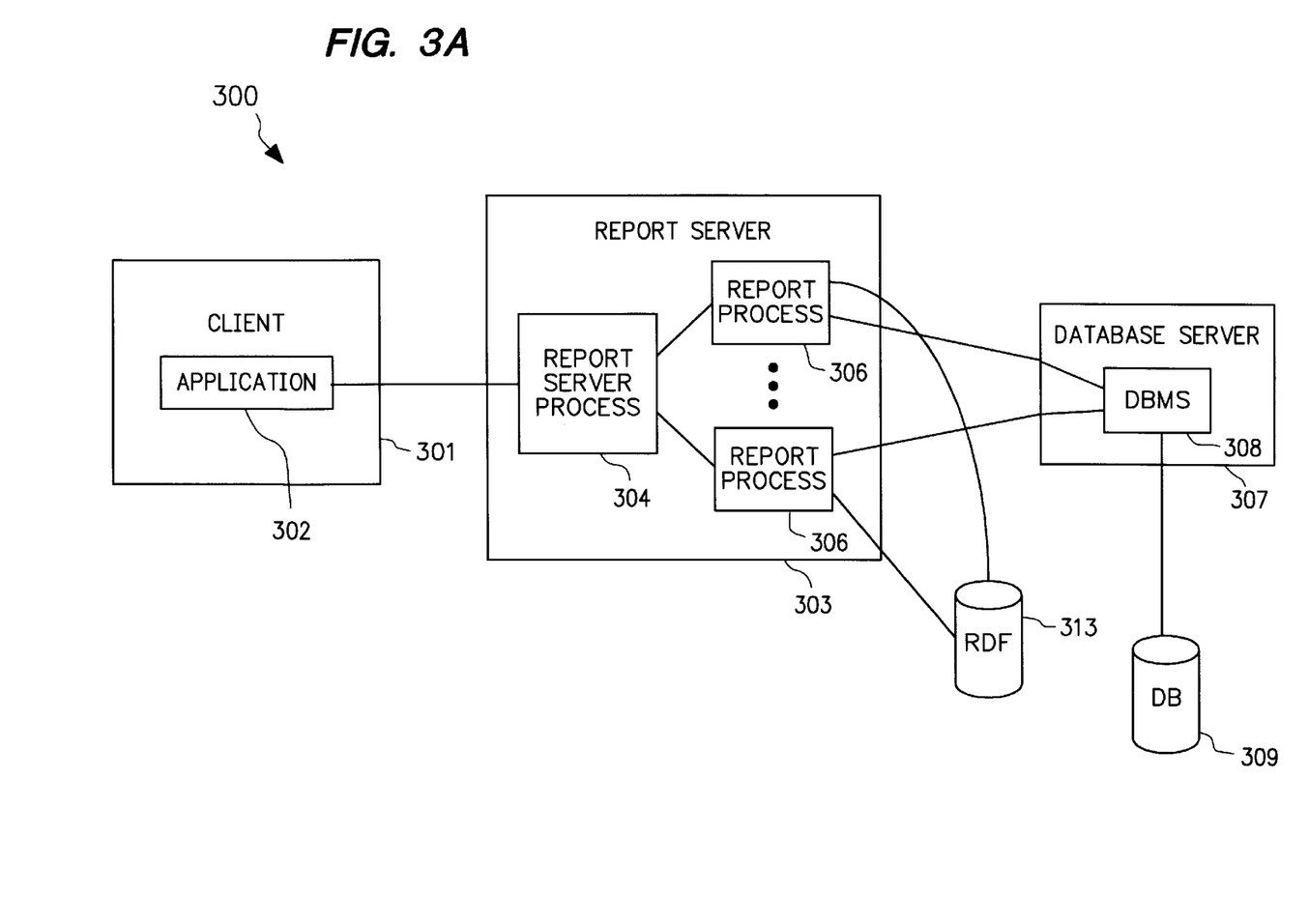
FIG. 3A illustrates an apparatus for processing reports according to an embodiment of the present invention.
Figure 3B:
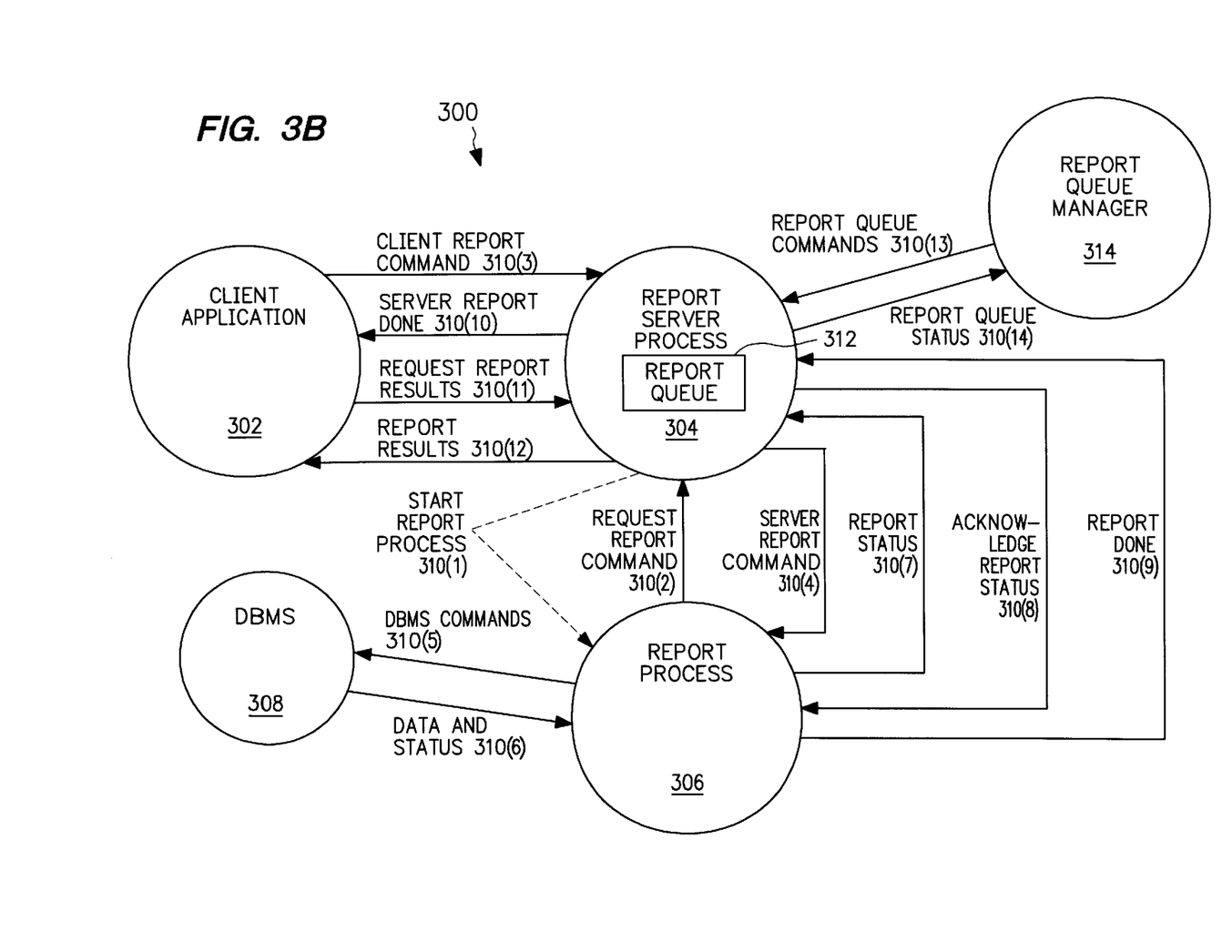
FIG. 3B illustrates report processing according to the embodiment of the present invention illustrated in FIG. 3A.

FIG. 3 illustrates an apparatus 300 for processing reports according to one embodiment of the present invention which includes a client 301, a report server 303, a database server 307 and a database (DB) 309, all of which may reside on a single node/machine, or alternatively, on different nodes/machines in a computing network. If residing on different nodes/machines, then a communication link, such as a network connection, is provided to connect the nodes/machines to support the various communications illustrated in FIGS. 3A and 3B.

In general, after startup of the client 301, the report server 303 and the database server 307, a report server process 304, executing on the report server 303, immediately starts and initializes one or more report server processes 306, also executing on the report server 303. At some time later, a client application 302, executing on the client 301, issues a report command to the report server process 304. The report server process 304 assigns the task of processing the report to one of the active report processes 306. The report process 306 processing the report then interacts with a database management system (DBMS) 308, executing on the database server 307, to retrieve data stored on the DB 309 to process the report. During report processing, report status is made available to the client application 302 by the report server process 304.

The operation of the apparatus 300 of FIG. 3A is now described in more detail with reference to FIG. 3B. Various commands and signals have been labelled in FIG. 3B as 310(1) through 310(11) so as to more clearly describe the sequence of events as follows. It should be noted that although the client application 302, report process 306 and DBMS 308 are depicted and described as individual processes for purposes of simplicity, the present invention is equally applicable to arrangements having multiple client applications 302, multiple report processes 306 and multiple DBMSs 308, as described in more detail below.

Referring to FIG. 3B, after system initialization, the report server process 304 immediately starts 310(1) the report process 306. Starting the report process 306 includes loading the report process 306 into dynamic memory, initializing local variables and environment variables, reading message files and configuring any external I/O devices such as printers (not shown). After the report process 306 has been started and is ready to process a report, the report process 306 requests a report command 310(2) from the report server process 304. The report process 306 then remains idle until a report needs to be processed.

At some time later, the client application 302 needs to have a report prepared and issues a client report command 310(3) to the report server process 304. The client report command 310(3) contains all of the information necessary for the report process 306 to generate a report. According to one embodiment of the present invention, each client report command 310(3) includes the name of the report, a database connection string and various other report parameters. The database connection string specifies the particular database 309 (FIG. 3A) on which the data is stored, a database user ID and a database password for security. The report parameters define how the report is to be run. For example, the run parameters may define that only a particular company department is to access certain data. However, the client report command 310(3) may contain other information depending upon the specific application.

Upon receiving the client report command 310(3) from the client application 302, the report server process 304 stores the client report command 310(3) in a report queue 312. The report server process 304 then determines whether the report process 306 is available for report processing. The report process 306 may not be available if a prior report is not yet completed. Once the report process 306 is available, the report server process 304 reads the report command 310(3) from the report queue 312 and then transmits a server report command 310(4) to the report process 306. After receiving the server report command 310(4), the report process 306 opens a report definitions file (RDF) 313 (FIG. 3A) which indicates what data is to be included in the report and how it is to be arranged. The report process 306 then issues DBMS commands 310(5) to the DBMS 308 to establish a session/connection to the DBMS 308 based on the database connection string contained in the server report command 310(4) and to retrieve data from the DB 309 (FIG. 3A). The DBMS 308 then transmits data 310(6) back to the report process 306. With this data, the report process 306 prepares a report and transmits it to its intended destination, such as a printer or file. However, according to other embodiments of the present invention, report processing may involve other tasks such as printing a previously prepared report or merging two or more previously prepared reports. As is typical of report processes, the report process 306 may write intermediate report files to a storage medium (not illustrated) as necessary to complete its report processing.

During report processing, the report process 306 also periodically sends report status 310(7) to the report server process 304 which includes the location of the report file. In response to receiving the report status 310(7) from the report process 306, the report server process 304 sends an acknowledge report status 310(8) back to the report process 306. The acknowledge report status 310(8) also includes a command indicating whether the report process 306 should continue or halt processing of its current report. At some time during the processing of a report, the report server process 304 may determine that the current report process 306 should be terminated and will then instruct the report process 306 to terminate processing with the next acknowledge report status 310(8). Otherwise, the report process 306 will continue until the report is complete.

After the report is completed, the report process 306 performs various cleanup tasks such as deleting temporary files and de-allocating memory no longer required. After cleanup, the report process 306 informs the report server process 304 that the report is done 310(9) and requests a new report command 310(2) from the report server process 304.

In the meantime, having been notified that the report is done 310(9), the report server process 304 informs the client application 302 that the report server process 304 is done 310(10) with the report. When the client application 302 is ready to access the results of the report, the client application 302 requests the report results 310(11) from the report server process 304, which provides the report results 310(12) to the client application 302. Of course, in some situations, the client application 302 may not request the report results 310(11) from the report server process 304 at all. For example, the report processing may have simply involved the printing of an existing report and no report results would be required other than notification that the server report 304 is done 310(10).

According to another embodiment of the present invention, upon startup, the report server process 304 automatically starts and initializes a minimum number of report processes 306 before client applications 302 begin issuing client report commands 310(3). If the number of unprocessed client report commands 310(3) in the report queue 312 greatly exceeds the processing capability of the currently executing report processes, then the report server process 304 dynamically allocates additional report processes 306 up to a maximum number of report processes 306. On the other hand, if because of reduced report demand, many of the report processes 306 are idle, the report server may terminate one or more idle report processes 306 to reduce processing overhead. Many report process allocation schemes may be used and the type and sophistication of the particular report process allocation scheme used depends upon the particular report system 300. When subsequent reports are processed by a particular report process 306, an (RDF) 313 only has to be opened if the report is a different report type than the last report processed. In addition, if based on the database connection string the same database 309 is to be used, then the existing DBMS 308 session/connection can be used, greatly reducing the startup time.

In another embodiment of the present invention, a report queue manager 314 is provided to manage the report queue 312. The report queue manager 314 issues report queue commands 310(13) to the report server process 304 to obtain report queue status 310(14) or to actively administer a particular report item or command in the report queue 312. For example, the report queue manager 314 may provide privileges to client applications 302 to delete a particular report item from the report queue 312 if the proper security requirements are satisfied. In addition, the report queue manager 314 may allow a user to change the minimum and maximum number of report processes 306 that can be spawned by the report server process 304, based upon system load requirements. Some or all of the report queue manager 314 functions may be implemented on other client applications 302 depending upon the particular report processing system 300.

To minimize the impact of report processing on the client application 302, the report server process 304, the report processes 306 and the DBMS 308 are ideally arranged to execute on different machines from the client application 302. However, if the machine executing the client application 302 has sufficient processing power, the report server process 304, the report processes 306 and the DBMS 308 may be implemented on the same machine without departing from the scope of the present invention.

In addition, report processing may be implemented synchronously or asynchronously. For synchronous report processing, the client application 302 issues a client report command 310(3) and then waits for the server report done 310(10) signal from the report server. However, for asynchronous report processing, the client application 302 issues a client report command 310(3) to the report server process 304 which immediately returns control to the client application 302 enabling the client application 302 to continue execution of other tasks, including that the client may request an up-to-date status of the report from the report server.

In one embodiment of the present invention, communications between the client application 302, the report server process 304, the report process 306, the DBMS 308 and the report queue manager 314 are provided by a connection based message passing system such as remote procedure calls (RPC). RPC is advantageous because it integrates communication link/device state information. This information allows the report server process 304, for example, to detect if a report process 306 is no longer active or "alive" by detecting when the communication channel to the report process 306 goes down. Of course the termination of a communications channel may mean that only the communications channel has failed and the report process 306 may continue and complete its report processing.

Nevertheless, a particular embodiment of the present invention may establish certain presumptions when such a failure occurs and may take appropriate corrective action. For example, the report server process 304 may update the status of the failed report process in the report queue and even inform the client application 302 if appropriate.

An example of a portion of an RPC implementation of one embodiment of the present invention is as follows:

| REPORT SERVER | |
|---|---|
| Create Report Process () | Operating System (OS) call to start a report process. |
| REPORT PROCESS | |
| Connect To Report Server (report_server_name) | Connects the Report Process to the Report Server and returns a connection_ID. |
| Get Report Server Command (connection_ID) | Returns a Report Server command. |
| Send Report Process Status (connection_ID, report_process_status) | Sends Report Process Status to Report Server. Returns true/false signal indicating whether report processing should continue. |
| CLIENT APPLICATION | |
| Connect To Report Server (report_server_name) | Connect the client application to the Report Server and returns a connection_ID. |
| Process Report Sync (connection_ID, client_report_command) | Processes a report synchronously - Waits for report to finish, returns a final report status. |
| Process Report Async (connection_ID, client_report_command) | Starts report processing asynchronously -no retrieve status provided. |
| Get Report Process Status (connection_ID) | Returns current status of report process. |
| Disconnect From Report Server (connection_ID) | Terminates connection with the Report Server. |
| Kill Report Process (connection_ID) | Terminate a Report Process. |
| REPORT QUEUE MANAGER | |
| Get Queue Status (connection_ID) | Retrieve current status of Report Queue. |
| Shutdown Report Server (connection_ID) | Instructs the Report Server to shut down as long as all current report processes are completed. |
| Kill Report Process (connection_ID) | Terminate a Report Process. |

The implementation of the present invention using RPC is illustrative and not limiting. Other message passing protocols may be implemented depending upon the specific needs of the system without departing from the scope of the present invention.

In one embodiment of the present invention, the report process 306 was implemented using Oracle Corporation's Oracle Reports Version 3.0. Other software products may be used without departing from the scope of the present invention.

The present invention offers several advantages over prior approaches to processing reports. First, delays associated with dynamically starting a report process 306 for each client report command 310(3) are avoided by starting and initializing one or more report processes 306 before a client report command 310(3) is sent to the report server process 304. Also, the present invention avoids reconnecting to the database for each report by reusing the connection if consecutive report commands have the same connection string.

In addition, centralized report processing by the report server process 304 allows the client application 302 to retrieve report status from the report server process 304 at any time without using the DBMS 308 as a message/status center for which it was not designed. Centralized report processing by the report server process 304 also provides for external report management through the report queue manager 314 or other external process.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for generating reports, the method comprising the steps of:
   a) a report server dynamically allocating a non-persistent report process;
   b) in response to a first server report command from the report server, the report process generating a first report;
   c) after the first report has been generated, the report process continuing to execute; and
   d) in response to a second server report command from the report server, the report process generating a second report.

2. The method of claim 1 further comprising the step of the report process requesting the first and second server report commands from the report server.

3. The method of claim 1, wherein the step of the report process generating the first report further comprises the step of the report process providing a first report status, associated with the status of the first report, to the report server, and
   wherein the step of the report process generating the second report further comprises the step of the report process providing a second report status, associated with the status of the second report, to the report server.

4. The method of claim 3 further comprising the steps of,
   a) the report server acknowledging receipt of the first report status to the report process, and
   b) the report server acknowledging receipt of the second report status to the report process.

5. The method of claim 3 further comprising the steps of,
   a) after the completion of the first report, the report process providing a first report done status to the report server, and
   b) after the completion of the second report, the report process providing a second report done status to the report server.

6. The method of claim 5, wherein both the first and second server report commands are provided by the report server in response to first and second client report commands respectively from a client application and wherein the method further comprises the steps of,
   a) the client application requesting first report results from the report server, and
   b) the client application requesting second report results from the report server.

7. The method of claim 6, further comprising the steps of,
   a) in response to the request for first report results from the client application, the report server providing first report results to the client application, and
   b) in response to the request for second report results from the client application, the report server providing second report results to the client application.

8. The method of claim 1, further comprising the steps of,
a) the report server receiving first and second client report commands from a client application,
b) the report server storing the first and second client report commands in a report queue,
c) the report server retrieving the first and second client report commands from the report queue, and
d) the report server generating and transmitting first and second server report commands, corresponding to the first and second client report commands respectively, to the report process.

9. The method of claim 8, further comprising the step of the report server determining whether the report process has completed generating the first server report command before the report server transmits the second server report command to the report process.

10. The method of claim 1, wherein both the first and second server report commands are provided by the report server in response to first and second client report commands respectively, received by the report server from a client application, and
wherein the method further comprises the steps of,
a) the client application issuing a request for first report results from the report server, and
b) the client application issuing a request for second report results from the report server.

11. The method of claim 10, further comprising the steps of,
a) in response to the request for first report results from the client application, the report server providing first report results to the client application, and
b) in response to the request for second report results from the client application, the report server providing second report results to the client application.

12. The method of claim 1, wherein the step of starting the report process further includes the steps of,
a) allocating storage space for a report file on a storage medium,
b) opening the report file,
c) loading the report process into a memory for execution, and
d) establishing a connection between the report process and a database.

13. The method of claim 12, further comprising the steps of,
a) the report process requesting first and second server report commands from the report server,
b) the report process providing a first report status and a second report status to the report server,
c) the report server acknowledging receipt of the first and second report statuses from the report process,
d) the report process providing a first report done status and a second report done status to the report server,
e) the report server storing the first and second server report commands in a queue,
f) a client application requesting first and second report results from the report server, and
g) in response to the request for first and second report results, the report server providing first and second report results to the client application.

14. The method as recited in claim 1, further comprising the report process retrieving first report definition data that specifies attributes of the first report, the report process determining whether the second report is the same type as the first report, and
if the second report is the same type as the first report, then the report process using the first report definition data for generating the second report.

15. The method as recited in claim 1, further comprising
the report process establishing a first database connection for generating the first report,
the report process determining whether the first database connection can be used for generating the second report, and
if the first database connection can be used for generating the second report, then the report process using the first database connection for generating the second report.

16. A method for generating a database report, the method comprising the steps of:
a) a report server dynamically allocating a non-persistent report process;
b) in response to a first client report command from a client application, the report server issuing a first server report command to the report process;
c) in response to the first server report command from the report server, the report process generating a first report;
d) after the first report has been generated by the report process, the report process continuing to execute;
e) in response to a second client report command from the client application, the report server issuing a second server report command to the report process; and
f) in response to the second server report command from the report server, the report process generating a second report.

17. The method of claim 16, further comprising the step of retrieving data from a database.

18. The method of claim 17, further comprising the steps of,
a) the report process providing a first report status to the report server, and
b) the report process providing a second report status to the report server.

19. The method of claim 18, further comprising the steps of,
a) the report server acknowledging receipt of the first report status from the report process, and
b) the report server acknowledging receipt of the second report status from the report process.

20. The method of claim 19, further comprising the step of the report process providing first and second report results to the report server.

21. The method of claim 20, further comprising the steps of,
a) the client application transmitting a request for first and second report results from the report server, and
b) in response to the request from the client application, the report server providing first and second report results to the client application.

22. The method of claim 16, further comprising the steps of,
a) the report process requesting the first server report command from the report server, and
b) the report process requesting the second server report command from the report server.

23. The method as recited in claim 16, further comprising the report process retrieving first report definition data that specifies attributes of the first report, the report process determining whether the second report is the same type as the first report, and if the second report is the same type as the first report, then the report process using the first report definition data for generating the second report.

24. The method as recited in claim 16, further comprising the report process establishing a first database connection for generating the first report, the report process determining whether the first database connection can be used for generating the second report, and if the first database connection can be used for generating the second report, then the report process using the first database connection for generating the second report.

25. A computer-readable medium having stored thereon a plurality of sequences of instructions for generating reports, the plurality of sequences of instructions including sequences of instructions which, when executed by one or more processors, cause the one or more processors to perform the steps of:

a) a report server dynamically allocating a non-persistent report process;

b) in response to a first server report command from the report server, the report process generating a first report;

c) after the first report has been generated, the report process continuing to execute; and d) in response to a second server report command from the report server, the report process generating a second report.

26. The computer-readable medium of claim 25, wherein the computer-readable medium further includes instructions for the report process requesting the first and second server report commands from the report server.

27. The computer-readable medium of claim 25, wherein the computer-readable medium further includes instructions for the report process providing a first report status that indicates status of the first report to the report server, and wherein the step of the report process generating the second report further comprises the step of the report process providing a second report status that indicates status of the second report to the report server.

28. The computer-readable medium of claim 27, wherein the computer-readable medium further includes instructions for, a) the report server acknowledging receipt of the first report status to the report process, and b) the report server acknowledging receipt of the second report status to the report process.

29. The computer-readable medium of claim 27, wherein the computer-readable medium further includes instructions for, a) after completion of the first report, the report process providing a first report done status to the report server, and b) after completion of the second report, the report process providing a second report done status to the report server.

30. The computer-readable medium of claim 29, wherein both the first and second report commands are provided by the report server in response to first and second client report commands respectively from a client application and wherein the computer-readable medium further includes instructions for, a) the client application transmitting a request for first report results from the report server, and b) the client application transmitting a request for second report results from the report server.

31. The computer-readable medium of claim 30, wherein the computer-readable medium further includes instructions for, a) in response to the request for first report results from the client application, the report server providing first report results to the client application, and b) in response to the request for second report results from the client application, the report server providing second report results to the client application.

32. The computer-readable medium of claim 25, wherein the computer-readable medium further includes instructions for, a) the report server receiving first and second client report commands from a client application, b) the report server storing the first and second client report commands in a report queue, c) the report server retrieving the first and second client report commands from the report queue, and d) the report server generating and transmitting first and second server report commands, corresponding to the first and second client report commands respectively, to the report process.

33. The computer-readable medium of claim 32, wherein the computer-readable medium further includes instructions for the report server determining whether the report process has completed processing of the first server report command before the report server transmits the second server report command to the report process.

34. The computer-readable medium of claim 25, wherein both the first and second report commands are provided by the report server in response to first and second client report commands respectively, received by the report server from a client application, and wherein the computer-readable medium further includes instructions for, a) the client application issuing a request for first report results from the report server, and b) the client application issuing a request for second report results from the report server.

35. The computer-readable medium of claim 34, wherein the computer-readable medium further includes instructions for, a) in response to the request for first report results from the client application, the report server providing first report results to the client application, and b) in response to the request for second report results from the client application, the report server providing second report results to the client application.

36. The computer-readable medium of claim 25, wherein the computer-readable medium further includes instructions for, a) allocating storage space for a report file on a storage medium, b) opening the report file, c) loading the report process into a memory for execution, and d) establishing a connection between the report process and a database.

37. The computer-readable medium of claim 36, wherein the computer-readable medium further includes instructions for, a) the report process requesting first and second server report commands from the report server, b) the report process providing a first report status and a second report status to the report server, c) the report server acknowledging receipt of the first and second report statuses from the report process, d) the report process providing a first report done status and a second report done status to the report server, e) the report server storing the first and second server report commands in a queue, f) a client application requesting first and second report results from the report server, and g) in response to the request for first and second report results, the report server providing first and second report results to the client application.

38. The computer-readable medium as recited in claim 25, further including one or more sequences of one or more instructions which, when executed by the one or more processors, cause the one or more processors to perform the steps of the report process retrieving first report definition data that specifies attributes of the first report, the report process determining whether the second report is the same type as the first report, and if the second report is the same type as the first report, then the report process using the first report definition data for generating the second report.

39. The computer-readable medium as recited in claim 25, further including one or more sequences of one or more instructions which, when executed by the one or more processors, cause the one or more processors to perform the steps of the report process establishing a first database connection for generating the first report, the report process determining whether the first database connection can be used for generating the second report, and if the first database connection can be used for generating the second report, then the report process using the first database connection for generating the second report.

40. A system for generating database reports, the system comprising:

a) one or more nodes;

b) a report server executing on said one or more nodes, said report server being configured to transmit a first server report signal, said report server being further configured to transmit a second server report signal; and c) a dynamically-allocated non-persistent report process executing on said one or more nodes and being communicatively coupled to said report server, said report process further being configured to generate a first database report in response to said first server report signal and to continue to execute after generating the first database report, said report process further being configured to generate a second database report in response to said second server report signal.

41. The system of claim 40, wherein said communicative coupling of said report process to said report server supports remote procedure calls, and wherein said report server transmits said first server report signal to said report process in response to a remote procedure call to said report server by said report process.

42. The system of claim 40, wherein said system further comprises a report queue residing on said one or more nodes, and wherein said report server is further configured to said second server report signal in said report queue while said report process is generating the first database report, and to transmit the second server report signal to the report process after the report process completes the first database report.

43. The system of claim 42, wherein said system further comprises a report queue manager executing on said one or more nodes and being communicatively coupled to said report queue, and wherein said report queue manager is configured to transmit report queue signals to said report queue, and wherein said report queue is further configured to transmit report queue status signals to said report queue manager in response to said report queue signals.

44. The system of claim 42, wherein said report server is further configured to generate said first server report signal in response to a first client report signal received by said report server from a client application, and wherein said report server is further configured to generate said second server report signal in response to a second client report signal received by said report server from the client application.

45. The system of claim 42, wherein said report process is further configured to transmit a first report status associated with a status of the first database report to said report server, and wherein, said report process is further configured to transmit a second report status associated with the second database report to said report server.

46. The system as recited in claim 40, wherein the report process is further configured to retrieve first report definition data that specifies attributes of the first report, determine whether the second report is the same type as the first report, and if the second report is the same type as the first report, then use the first report definition data for generating the second report.

47. The system as recited in claim 40, wherein the report process is further configured to establish a first database connection for generating the first report, determine whether the first database connection can be used for generating the second report, and if the first database connection can be used for generating the second report, then use the first database connection for generating the second report.

48. A computer-readable medium carrying one or more sequences of one or more instructions for generating database reports, the one or more sequences of one or more instructions including instructions which, when executed by one or more processors, cause the one or more processors to perform the steps of:

a report server dynamically allocating a non-persistent report process;

in response to a first client report command from a client application, the report server issuing a first server report command to the report process;

in response to the first server report command from the report server, the report process generating a first report;

after generating the first report, the report process continuing to execute;

in response to a second client report command from the client application, the report server issuing a second server report command to the report process; and in response to the second server report command from the report server, the report process generating a second report.

49. The computer-readable medium as recited in claim 48, further including one or more sequences of one or more instructions which, when executed by the one or more processors, cause the one or more processors to perform the step of retrieving data from a database.

50. The computer-readable medium as recited in claim 48, further including one or more sequences of one or more instructions which, when executed by the one or more processors, cause the one or more processors to perform the steps of the report process requesting the first server report command from the report server, and the report process requesting the second server report command from the report server.

51. The computer-readable medium as recited in claim 49, further including one or more sequences of one or more instructions which, when executed by the one or more processors, cause the one or more processors to perform the steps of the report process providing a first report status to the report server, and the report process providing a second report status to the report server.

52. The computer-readable medium as recited in claim 51, further including one or more sequences of one or more instructions which, when executed by the one or more processors, cause the one or more processors to perform the steps of the report server acknowledging receipt of the first report status from the report process, and the report server acknowledging receipt of the second report status from the report process.

53. The computer-readable medium as recited in claim 52, further including one or more sequences of one or more instructions which, when executed by the one or more processors, cause the one or more processors to perform the step of the report process providing first and second report results to the report server.

54. The computer-readable medium as recited in claim 53, further including one or more sequences of one or more instructions which, when executed by the one or more processors, cause the one or more processors to perform the steps of the client application transmitting a request for first and second report results from the report server, and in response to the request from the client application, the report server providing first and second report results to the client application.

55. The computer-readable medium as recited in claim 48, further including one or more sequences of one or more instructions which, when executed by the one or more processors, cause the one or more processors to perform the steps of the report process retrieving first report definition data that specifies attributes of the first report, the report process determining whether the second report is the same type as the first report, and if the second report is the same type as the first report, then the report process using the first report definition data for generating the second report.

56. The computer-readable medium as recited in claim 48, further including one or more sequences of one or more instructions which, when executed by the one or more processors, cause the one or more processors to perform the steps of the report process establishing a first database connection for generating the first report, the report process determining whether the first database connection can be used for generating the second report, and if the first database connection can be used for generating the second report, then the report process using the first database connection for generating the second report.

* * * * *

UNITED STATES PATENT AND TRADEMARK OFFICE
CERTIFICATE OF CORRECTION

PATENT NO. : 6,226,659 B1  
DATED : May 1, 2001  
INVENTOR(S) : Simon Wong et al.

Page 1 of 1

It is certified that error appears in the above-identified patent and that said Letters Patent is hereby corrected as shown below:

<u>Title page,</u>  
Replace "Filed: Sep. 17, 1996" with -- Filed: Sep. 16, 1996 --.

Signed and Sealed this

Twentieth Day of November, 2001

Attest:

*Nicholas P. Godici*

NICHOLAS P. GODICI  
*Acting Director of the United States Patent and Trademark Office*

*Attesting Officer*